May 19, 1964     G. P. LEADER     3,133,396
RECEPTACLE AND SUPPORT FOR MOWER
Filed Nov. 13, 1962     2 Sheets-Sheet 1
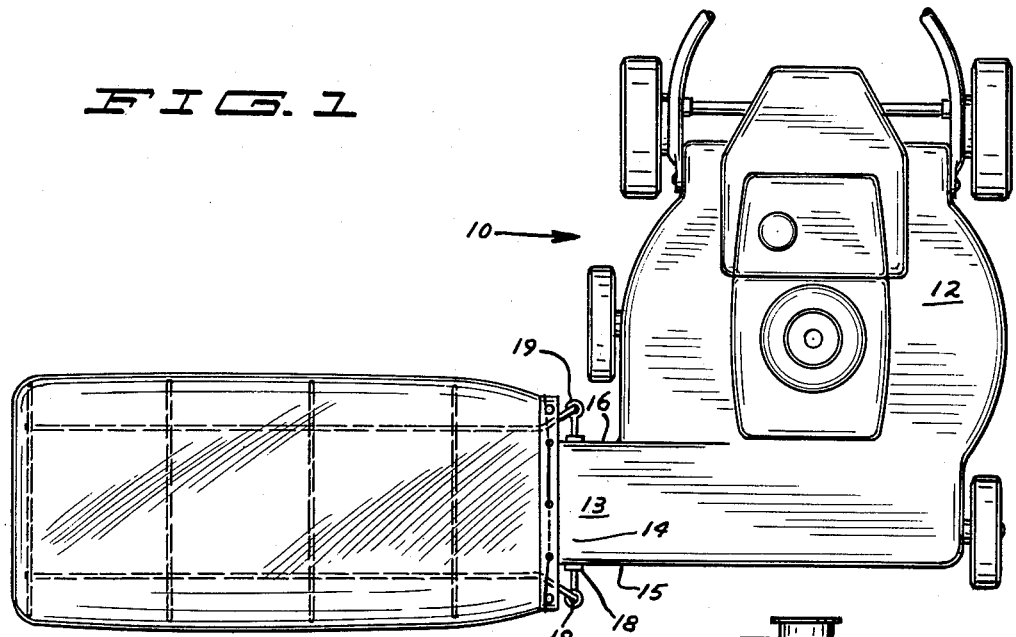
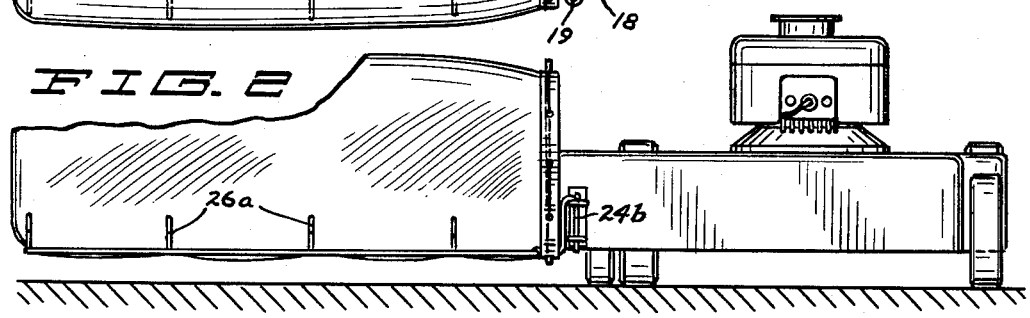
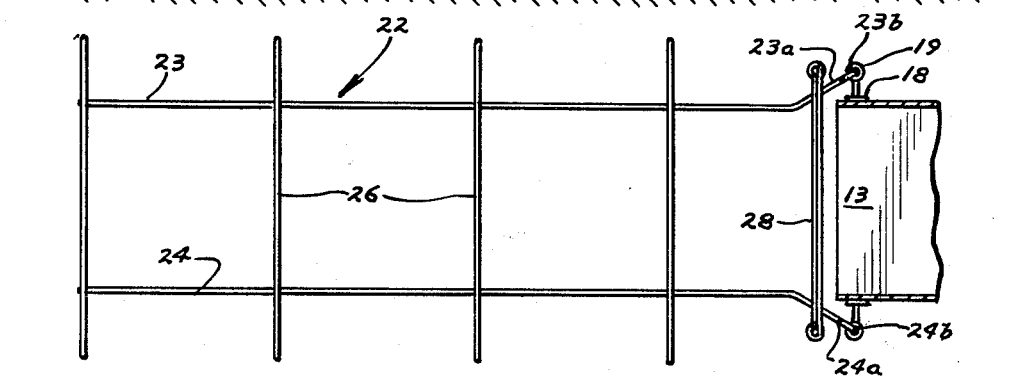
INVENTOR.
GERALD P. LEADER
BY
ATTORNEYS May 19, 1964  G. P. LEADER  3,133,396
RECEPTACLE AND SUPPORT FOR MOWER
Filed Nov. 13, 1962  2 Sheets-Sheet 2
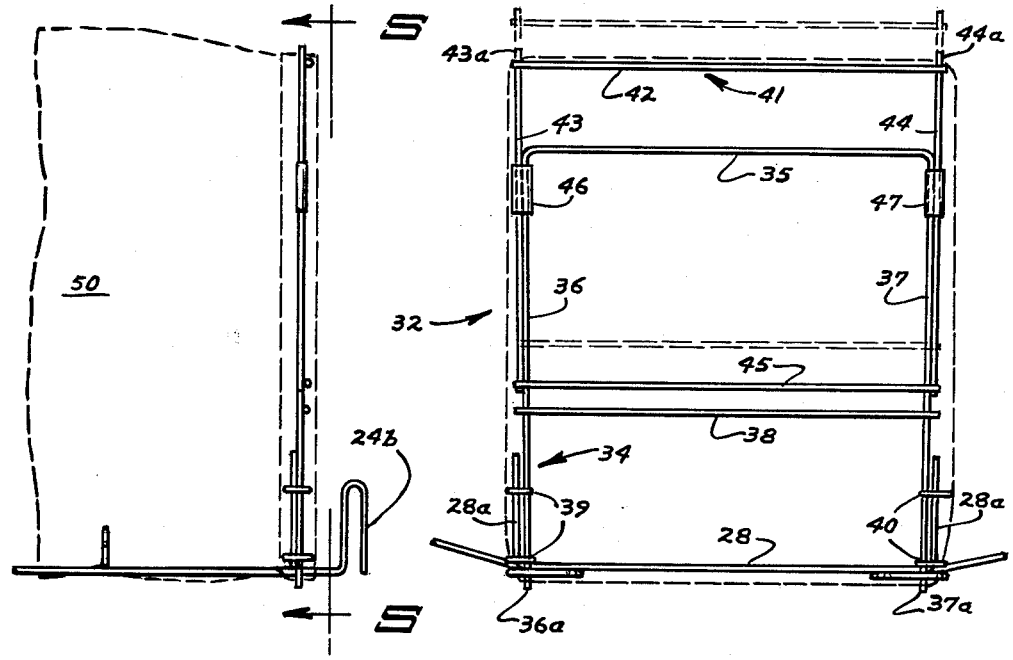
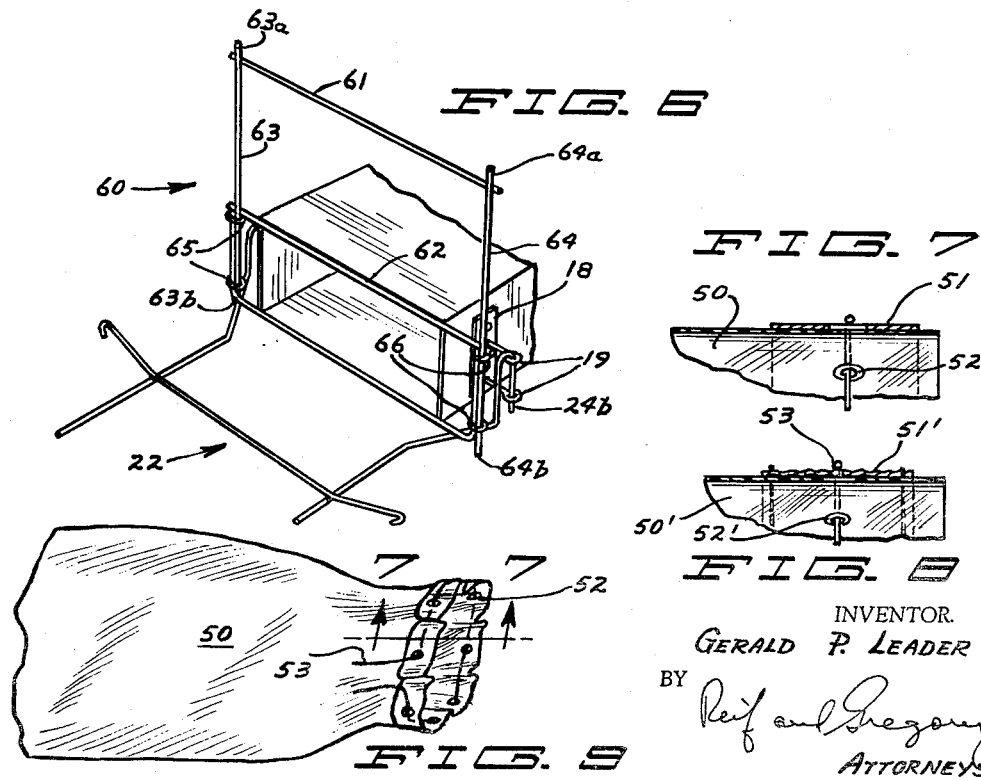
INVENTOR.
GERALD P. LEADER
BY
ATTORNEYS

United States Patent Office 3,133,396
Patented May 19, 1964

3,133,396
RECEPTACLE AND SUPPORT FOR MOWER
Gerald P. Leader, 1114 Russell Ave. N.,
Minneapolis, Minn.
Filed Nov. 13, 1962, Ser. No. 237,270
5 Claims. (Cl. 56—202)

This invention relates to a receptacle to be used in connection with a grass cutter or lawn mower, and more particularly in connection with a rotary type of lawn mower. Such receptacles are used in receiving grass cuttings and in the fall of the year they are also used to receive leaves picked up by the mower.

A common type of receptacle or bag is of a cloth-like material having an open end secured about the discharge outlet of the mower with the closed or remote end of the bag being secured to or suspended from the handle portion of the mower. Such receptacles as are commonly used have limited capacity and must be emptied frequently. Such bags are limited as to size because of the manner in which they are supported by the mower.

It is desirable to have a receptacle or bag which may be supported on a member such as a cradle, in order that a substantially size receptacle may be used, such as on the order of having capacity of four bushels. It is also desirable to have such a receptacle or bag which is of such relatively low cost that it is disposable with the material therein, or it may be used for retaining the material therein until the material is disposed of.

It is an object of this invention therefore to provide a supported large capacity receptacle or bag for a lawn mower.

It is another object of this invention to provide a cradle readily removably attachable to the housing of a lawn mowever to support a receptacle for grass cuttings and leaves.

It is a further object of this invention to provide a disposible receptacle or bag for a lawn mower and a supporting framework readily attachable to the housing of a mower for operative association of the bag with the discharge outlet of the mower.

It is also an object of this invention to provide a bag supporting framework which is quickly and easily removably mounted onto a lawn mower for use therewith as may be desired.

These and other objects and advantages of the invention will be fully set forth in the following description made in connection with the accompanying drawings in which like reference characters refer to similar parts throughout the several views and in which:

FIG. 1 is a top plan view of applicant's invention in operating position;

FIG. 2 is similar to FIG. 1 in side elevation with a portion thereof broken away;

FIG. 3 is a fragmentary top plan view of a portion of applicant's device;

FIG. 4 is a fragmentary view on an enlarged scale of a portion of applicant's device in side elevation;

FIG. 5 is a view in front elevation and partially in vertical section taken on line 5—5 of FIG. 4, as indicated by the arrows, with a portion thereof shown in alternate position in dotted line;

FIG. 6 is a fragmentary view in perspective showing a modification of a portion of applicant's device;

FIG. 7 is a fragmentary view in section taken on line 7—7 of FIG. 9, as indicated by the arrows;

FIG. 8 is a view similar to FIG. 7 showing a modification thereof; and

FIG. 9 is a perspective view of a receptacle used in connection with applicant's device.

Referring to FIGS. 1 and 2, the character 10 indicates generally a conventional design of a rotary type of a powered lawn mower comprising a housing 12 having a portion 13 thereof forming a discharge outlet. Said outlet is generally rectangular in elevation having a top wall 14 and side wall portions 15 and 16. The bottom thereof of the is customary is open to the ground.

Secured to said side walls 15 and 16 adjacent the lower portions of the leading edges thereof are a pair of brackets 18 having a flat rod body portion which will be removably secured to said side walls in a conventional manner, as with metal screws or bolts. Said brackets which may be variously formed as to specific detail are here shown each having a pair of outwardly extending spaced vertically aligned eyelets 19.

Arranged and constructed to be removably supported in an outwardly suspended or cantilevered position is a bag supporting member 22.

Said bag supporting member 22 is here indicated as being formed of suitable rod-like material but may be formed of other suitable material, such as of tubular members. Said member 22 comprises a pair of parallel side members 23 and 24 spaced apart substantially the width of the discharge outlet 13 and having diverging forward end portions 23a and 24a. Said forward end portions are upwardly angled and reversely bent to form upstanding hook portions 23b and 24b, with said hook portions being disposable into said brackets 18. The framework 22 will be formed of material of sufficient dimension and rigidity to extend outwardly horizontally from said brackets and support weight thereon represented by a grass filled receptacle or bag, as will be described.

Extending transversely of said side members 23 and 24 spaced longitudinally thereof, and secured thereto as by welding, are a plurality of cross members 26 shown here having upwardly turned free end portions 26a whereby said bag supporting member 22 is in the form of a cradle.

A cross member 28 is secured as by welding to the side members 23 and 24 and more specifically to the diverging portions 23a and 24a thereof to be adjacent the forward end portion of said cradle close to the mouth of the discharge outlet of said mower when said cradle is in operating position. Said cross member 28 has upstanding end portions 28a at either end thereof.

Arranged and constructed to be supported in an upstanding position by said upstanding portions 28a is a supporting member 32 adapted to retain in open position the mouth of a receptacle or bag adjacent said discharge outlet 13. One form of this construction is hereinafter set forth.

Said member 32 shown formed of rod-like material comprises a lower frame portion 34 and an upper extendible frame portion 41. Said frame portion 34 comprises a top cross member or bar 35 having right-angled depending or leg members 36 and 37 and having a reinforcing cross bar 38 secured to said leg members spaced somewhat upwardly thereof to be positioned above the discharge outlet opening. Secured in vertically spaced alignment respectively to the lower end portions of said leg members 36 and 37 are pairs of eyelets 39 and 40. Thus said leg members 36 and 37 with their respective eyelets will be disposed over said upstanding portion 28a to be supported thereby. Stub portions 36a and 37a of said leg members 36 and 37 will extend below said eyelets 39 and 40.

In sliding or extendible engagement with said frame portion 34 is the frame portion 41 shown to be substantially rectangular in plan having an upper cross bar 42, side portions 43 and 44 and a lower cross bar 45. Said lower cross bar is somewhat shorter in length than said upper cross bar whereby said frame portion 34 tapers downwardly. Said upper cross bar is positioned somewhat below the upper end portions of said side portions 43 and 44 whereby stub portions 43a and 44a extend above said upper cross bar.

Carried by said leg portions 36 and 37 are sleeves 46 and 47 through which are disposed the side portions 43 and 44 respectively for slidable movement therethrough. Said sleeves will provide such tolerance that when the frame portion 41 is extended as indicated in dotted line in FIG. 5, that there will be sufficient frictional engagement to hold said frame portion in such extended position. Thus said member 32 comprises an extendible frame member to retain in open position the mouth of a receptacle or bag.

With reference to FIG. 9, a receptacle or bag 50 is shown. Said bag may be formed of various suitable materials. Within the embodiment of the invention here presented, said bag is indicated as being formed of relatively inexpensive thin plastic material to be a disposable bag. It has been found that a convenient and practical size for such a bag is one that has a capacity on the order of four bushels. The mouth of the bag will be suitably reinforced as with a tape 51 and said taped portion will be apertured at four spaced points, as indicated by the characters 52. A draw string 53 for a closure member is provided.

It is noted that the frame member 32 has greater width and height than has the discharge outlet 13 so that the open mouth of the bag 50 extending beyond the discharge outlet allows for free circulation of air to prevent any build-up of air pressure from interfering with the material being discharged into said bag through the discharge outlet of the mower.

*Operation*

The applicant's invention is readily attachable to any conventional rotary type power lawn mower. The side walls of the housing at the discharge outlet of the mower are easily drilled for the attachment of the brackets 18. These will remain permanently attached to the mower.

When it is desired to use the cradle and bag attachment, the cradle is first readily attached by inserting the hook portions 23b and 24b into the brackets 18 whereby the cradle is supported in suspended condition extending outwardly of the mower in alignment with the discharge outlet. The receptacle or bag 50 is next attached to the upstanding supporting member 32 to retain the mouth of the bag in open position. The frame portions 34 and 41 of this member are telescoped and the stub portions 43a, 44a, 36a and 37a respectively are disposed through the apertures in the mouth of the bag. The frame portion 41 is next extended upwardly until the mouth of the bag is tightly engaged about the whole of the supporting member 32. The portion 41 being somewhat tapered downwardly increases its frictional engagement with the sleeves 46 and 47 and there will be sufficient such frictional engagement to hold the frame portion 41 in extended position.

The upstanding frame is next positioned onto the cradle 22 adjacent the discharge outlet of the mower by disposing the eyelets 39 and 40 over the upstanding portions 28a of said cradle and the bag will be extended outwardly to overlie the extent of the cradle. As the mower is put into operation, the grass cuttings and leaves will be discharged into the bag until the work is done or until the bag is filled. Te bag 50 is indicated as having a capacity on the order of four bushels. This has been found to be a practical size. When the bag is filled, it is simply detached from the upstanding frame portion 32 and the draw string is pulled tight. The bag and its contents may then be disposed of, or if it is desired to use the material therein for fall or winter cover, the bag as a whole with its contents may be used such as providing shelter for the plants in a rose bed. The bag 50 is intended to be rather inexpensive to be disposable rather than requiring dumping of grass cuttings and leaves, which in a practical sense is on the order of a nuisance in cutting grass. Disposing of grass cuttings and leaves is always a problem. It is also a problem trying to find receptacles into which may be placed for disposal the collection of material from a common type of bag for a lawn mower, which bag is one of a permanent nature.

Bags or receptacles of common design generally have their mouth portions secured about the discharge outlet of the mower and have their rear portions secured to or suspended from the handle of the mower. These bags have been found to have limited capacity and must be emptied frequently. The applicant's bag is of such lightweight construction and has such a substantial capacity that it requires the support of a cradle such as is herein provided and its use comprises a real convenience in cutting grass.

*Modification*

With reference to FIG. 6, a modification is shown in which the upstanding frame portion 32 above described is here shown as a single frame member 60 having an upper cross bar 61, a lower cross bar 62 positioned to be in alignment with the top wall of the discharge outlet and the side members 63 and 64 are secured to said cross members as by welding to form a substantially rectangular figure. Said side members have stub portions 63a and 64a extending above said cross bar 61. Secured in vertically spaced alignment to the lower end portions of said side members are pairs of eyelets 65 and 66. Stub portions 63b and 64b of said side members extend below the lower of said eyelets.

The cradle member 22 as above described is used in connection with said frame member 60.

A modified bag 50' is indicated in FIG. 8 which is identical to bag 50 except that its mouth portion is gathered and provided with an elastic tape 51' having spaced apertures 52' therein whereby said mouth portion is readily stretched to be positioned over said frame 60 with the extending stub portions of said side members being disposed through said apertures.

The use of applicant's device in its modified form is substantially identical with that above described.

Thus it is seen that I have provided a substantial improvement in bag attachaments for rotary type lawn mowers in providing a disposable bag of large capacity and a simply constructed readily removable attachable supporting framework.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A receptacle in connection with a grass mower having a housing having a discharge outlet having in combination,
    a horizontally disposed supporting framework comprising spaced side members and a plurality of cross members removably supported by said housing and extending outwardly therefrom,
    means in connection with said housing suspending said framework,
    an upstanding framework substantially rectangular in form in the plane of the opening of said discharge outlet and being removably supported on said supporting member; and
    a receptacle overlying on said first mentioned framework and having an open end disposed about said upstanding framework in alignment with and in direct communication with said discharge outlet.

2. A receptacle in connection with a grass mower having a housing having a discharge outlet having in combination,
    a supporting framework comprising spaced side members and a plurality of cross members,
    said side members having forwardly extending hook portions spaced at either side of said housing,
    a bracket at either side of said housing adjacent said discharge outlet, said brackets receiving said hook portions and suspending said framework thereby, the cross member adjacent said discharge outlet having upturned end portions, an extendible framework being constructed to be removably carried on said upturned end portions, a receptacle having an open end, said open end being secured about said extendible framework, and said framework holding said open end of said receptacle adjacent said discharge outlet in communication therewith and to have an opening of substantially greater extent than that of said discharge outlet.

3. A receptacle in connection with a grass mower having a housing having a discharge outlet having in combination, a supporting framework having spaced side members and a plurality of cross members, brackets carried by said housing adjacent said discharge outlet, means integral with said framework removably secured to said bracket to suspend said framework outwardly from said housing, a receptacle having an open end and overlying said framework, a framework to retain in open condition said open end of said receptacle; and means removably mounting said framework onto said supporting frame adjacent said discharge outlet.

4. The structure set forth in claim 3, said second mentioned framework comprising a pair of extendible frame portions, means for holding said frame portions in extended position to retain in open condition the open end of said receptacle; and said framework and said open end of said receptacle being of greater open extent than the opening of said discharge outlet.

5. A receptacle in connection with a grass mower having a housing having a discharge outlet having in combination, an elongated substantially flat open framework, having a plurality of cross members, fastening means carried by said housing adjacent said discharge outlet, said framework having forwardly extending portions engaged by said fastening means, said framework extending outwardly of said discharge outlet, said framework having an upstanding frame portion facing said discharge outlet and being adjacent thereto, a receptacle having an open end portion, and said receptacle overlying said framework and having its open end portion disposed about said upstanding frame portion being retained in open position thereby in communication with said discharge outlet.

References Cited in the file of this patent
UNITED STATES PATENTS
2,932,146    Campbell _____ Apr. 12, 1960